Feb. 16, 1937.                H. KNECHT                2,071,207

RAILROAD VEHICLE

Filed April 17, 1935

Inventor
Heinrich Knecht
By B. Singer, atty.

Patented Feb. 16, 1937

2,071,207

UNITED STATES PATENT OFFICE 2,071,207

RAILROAD VEHICLE

Heinrich Knecht, Neuhausen, Switzerland, assignor to Schweizerische Industrie-Gesellschaft, Neuhausen, Switzerland, a corporation of Switzerland Application April 17, 1935, Serial No. 16,760
In Switzerland April 17, 1934

2 Claims. (Cl. 105—165)

The invention relates to a railroad vehicle being provided with trucks or bogies and more especially with trucks having two flexible axles.

The main object of the invention is to improve the construction of the trucks so as to adjust the axles to the radius of the curves of the rails.

I attain this object by providing two separate frames for the inner and outer axles and by interconnecting the same in such a manner that the inner axle frame automatically steers the outer frame. Provision first is made to place the load on the outer axle.

With these and other objects in view, the invention resides in the construction and arrangement of the parts as hereinafter set forth and pointed out in the appended claims.

Figure 1:
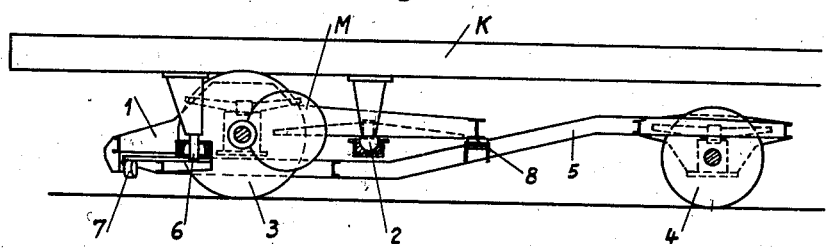
Figure 2:
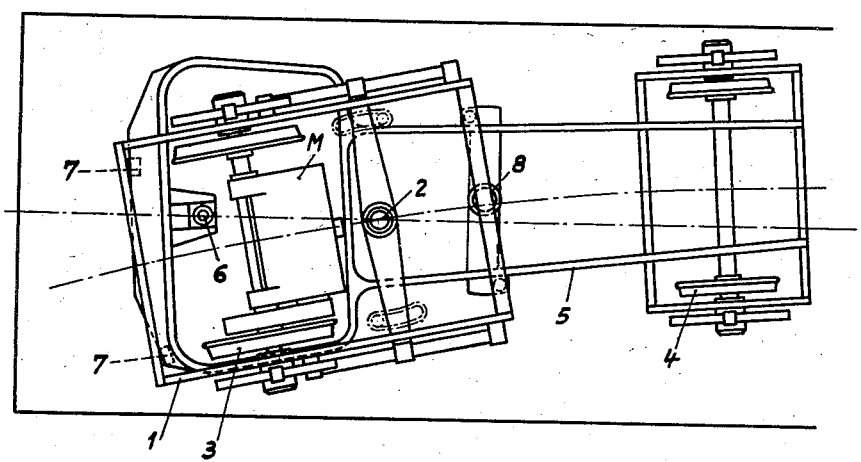
Figure 3:
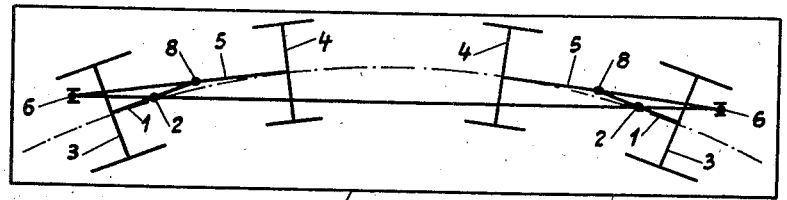

In the accompanying drawing Fig. 1 shows one end of a railroad carriage with a truck in elevation. Fig. 2 is a plan view thereof and Fig. 3 is a schematical plan of the entire undercarriage.

The invention comprises a railroad vehicle having a body K which is provided with two symmetrically disposed trucks of identical construction. Each of the trucks has two radial or flexible axles, viz. an inner flexible axle 4 and an outer flexible axle 3. The latter is mounted in a truck frame 1, the former in a truck frame 5. The body of chassis K of the carriage is supported by the frame 1 by means of a pivot 2, fixed to the body K. Pivot 2 is rotatably mounted in a bearing or centre pin socket fixed to said frame 1. The inner end of frame 1 is linked at 8 to the pole or radius bar of frame 5 which is designed as a Bissel-truck. The joint 8 itself, which at the same time supports frame 1, is disposed approximately half way between the two axles 3 and 4. The pole of truck 5 reaches as far as the outer end of truck frame 1 and is connected to the carriage body by means of a pivot 6 in such a way, that the latter has longitudinal play. This joint which is disposed outside the axle 3 is preferably designed so that there is no transmission of load between the truck frames 1 and 5 in that point. To this end pivot 2 has to be arranged as near to the outer axle 3 as possible so that the axle load of said axle 3 is much greater than that of the inner axle 4. Pole 5 is supported by truck frame 1 by means of bearing rollers 7.

The form of construction above referred to and shown in the drawing relates to a truck being provided with a propelling motor M which is mounted on the outer axle 3 in a well known manner. As the axle load of said axle 3 is very high compared with that of axle 4 the adhesion of the former is also very great.

When travelling along a curve the pivot 6 which is fixed to the carriage body K comes to lie beyond the middle of the railroad track. The middle of the inner flexible axle 4 then lies on the outer side of the longitudinal axis of the carriage body K and truck frame 5 is accordingly displaced. As truck frame 1 is linked to frame 5 by means of a bearing 8 the movement of frame 5 causes frame 1 to revolve about pivot 2, bringing said frame 1 in the correct radial position. When travelling straight ahead the undercarriage according to this invention assures a steady running in parallel of the two flexible axles 3 and 4, thereby preventing any irregular oscillating motion of the railroad carriage.

Of course the design of the undercarriage is exactly the same whether there is a motor M or not.

What I wish to secure by U. S. Letters Patent is:—

1. A vehicle running on rails comprising an underframe, two sets of axles, each of said sets forming a truck and each comprising two truck frames, an axle arranged in each trunk frame, said truck frames being pivotally interconnected at a point between the axles, and one of said truck frames being coupled to the underframe of the vehicle at a point outside the axles, and the other of said truck frames being coupled to the underframe of the vehicle at a point between the axles.

2. A vehicle running on rails and comprising an under-frame and two sets of axles; each of said sets constituting a truck and each comprising two truck frames, an axle arranged in each truck frame, a pivotal connection between said truck frames located at a point between the axles, a sliding connection between said truck frames outside the axles, a non-load supporting coupling between said under-frame and one of said truck frames at a point outside the axles, a load supporting coupling between the under-frame and the other truck frame at a point between the axles in virtue of which the weight of the under-frame is in part transmitted to the outer axle and in part transmitted to the inner frame at the point of connection of the two frames, and from which point of connection the load is further distributed via the inner frame to the inner axle and to said sliding connection outside the axles.

HEINRICH KNECHT.